United States Patent

Yang

[11] Patent Number: 5,999,798
[45] Date of Patent: Dec. 7, 1999

[54] COMPUTER PERIPHERAL DEVICE WITH CIRCUIT FOR WIRELESSLY RECEIVING AND TRANSMITTING SIGNALS

[75] Inventor: Danny Yang, Taipei Hsien, Taiwan

[73] Assignee: Primax Electronics, Inc., Taipei Hsien, Taiwan

[21] Appl. No.: 08/976,635

[22] Filed: Nov. 24, 1997

Related U.S. Application Data

[63] Continuation of application No. 08/601,163, Feb. 13, 1996.

[51] Int. Cl.$^6$ .............................. H04B 1/38; G06F 15/00
[52] U.S. Cl. ............................ 455/66; 455/557; 345/156
[58] Field of Search ............................. 455/66, 556, 557, 455/558, 575, 90, 344, 347, 345, 151.2; 273/148 B; 340/539; 345/156–158, 161, 163, 167–169; 463/36–39; 359/147, 148, 158, 181, 143, 154, 172; 364/705.01, 705.05, 705.06, 700.01

[56] References Cited

U.S. PATENT DOCUMENTS

| | | | |
|---|---|---|---|
| 4,754,268 | 6/1988 | Mori | 345/163 |
| 4,772,876 | 9/1988 | Laud | 340/539 |
| 4,924,216 | 5/1990 | Leung | 345/158 |
| 5,049,863 | 9/1991 | Oka | 345/163 |
| 5,081,711 | 1/1992 | Rickman, Jr. | 359/154 |
| 5,214,785 | 5/1993 | Fairweather | 395/800 |
| 5,440,559 | 8/1995 | Gaskill | 455/151.2 |
| 5,446,783 | 8/1995 | May | 455/90 |
| 5,519,527 | 5/1996 | Panton | 359/143 |
| 5,550,861 | 8/1996 | Chan et al. | 455/38.2 |
| 5,551,701 | 9/1996 | Bouton et al. | 463/36 |
| 5,617,236 | 4/1997 | Wang et al. | 359/172 |
| 5,636,264 | 6/1997 | Sulavuori et al. | 379/58 |
| 5,706,031 | 1/1998 | Brendzel et al. | 345/163 |
| 5,870,080 | 2/1999 | Burnett et al. | 345/163 |
| 5,877,745 | 3/1999 | Beeteson et al. | 345/156 |

*Primary Examiner*—Nguyen Vo
*Assistant Examiner*—Lester G. Kincaid
*Attorney, Agent, or Firm*—Bacon & Thomas

[57] ABSTRACT

A computer peripheral input device includes a signal receiver for wirelessly receiving an input remote signal for a computer, a signal transmitter for wirelessly transmitting an output remote signal from the computer, a signal processing circuit electrically connected to the signal receiver and the signal transmitter for providing the computer with a signal in response to the input remote signal received by the signal receiver and providing the output remote signal for the signal transmitter in response to a signal generated from the computer, and a peripheral input circuit electrically connected to the computer for providing a computer peripheral input signal for the computer.

13 Claims, 5 Drawing Sheets

COMPUTER PERIPHERAL DEVICE WITH CIRCUIT FOR WIRELESSLY RECEIVING AND TRANSMITTING SIGNALS

This application a Continuation of application Ser. No. 08/601,163, filed Feb. 13, 1996.

FIELD OF THE INVENTION

The present invention relates generally to a computer peripheral device, and more particularly to a computer peripheral device with circuit for wirelessly receiving and transmitting signals.

BACKGROUND OF THE INVENTION

It is believed that a signal receiver and a signal transmitter for wirelessly receiving and transmitting signals, respectively, will eventually become standard equipments of a computer in view of the current trend that the data communications between two computers are brought about by remote data signals, and that more and more computer users are on the buying spree of such a signal receiver and such a signal transmitter, which are hooked up with the computer and its peripheral equipments.

It is rather conceivable that such a practice, as described above, of adding the signal receiver and the signal transmitter for wirelessly receiving and transmitting signals, respectively, to a computer system is not only expensive but also wasteful.

SUMMARY OF THE INVENTION

It is therefore the primary objective of the present invention to provide a computer peripheral device with circuit for wirelessly receiving and transmitting signals, wherein the signal receiver and the signal transmitter are joined with the peripheral input circuit such that the remote data signals for the data communication between computers can be processed via the peripheral device.

It is another objective of the present invention to provide a computer peripheral device with circuit for wirelessly receiving and transmitting signals, where the signal receiver and the signal transmitter are joined with the peripheral input circuit such that the costs of the hardware and the software packages of the signal receiver and the signal transmitter are reduced, and the added values of the peripheral device of the computer are increased.

In accordance with the present invention, a computer peripheral input device with circuit for wirelessly receiving and transmitting signals, comprising a signal receiver for wirelessly receiving an input remote signal for a computer, a signal transmitter for wirelessly transmitting an output remote signal from the computer, a signal processing circuit electrically connected to the signal receiver and the signal transmitter for providing the computer with a signal in response to the input remote signal received by the signal receiver and providing the output remote signal for the signal transmitter in response to a signal generated from the computer, and a peripheral input circuit electrically connected to the computer for providing a computer peripheral input signal for the computer.

In accordance with another aspect of the present invention, the computer peripheral input device further includes an interface circuit electrically connected to the computer, the signal processing circuit and the peripheral input circuit for respectively communicating between an output/input port of the computer and the signal processing circuit and between the output/input port of the computer and the peripheral input circuit.

In accordance with another aspect of the present invention, the computer peripheral input device further includes a cable for transmitting the signals between the computer and the signal processing circuit and transmitting the computer peripheral input signal from the peripheral input circuit to the computer. The peripheral input circuit can be a mouse circuit, a keyboard circuit or a joystick circuit. The signal receiver can be an infrared receiver. The signal transmitter can be an infrared transmitter. The foregoing objectives, feature and functions of the present invention will be more readily understood upon a thoughtful deliberation of the following detailed description of two embodiments of the present invention in conjunction with the accompanying drawings.

DETAILED DESCRIPTION OF PREFERRED EMBODIMENT

Figure 1:
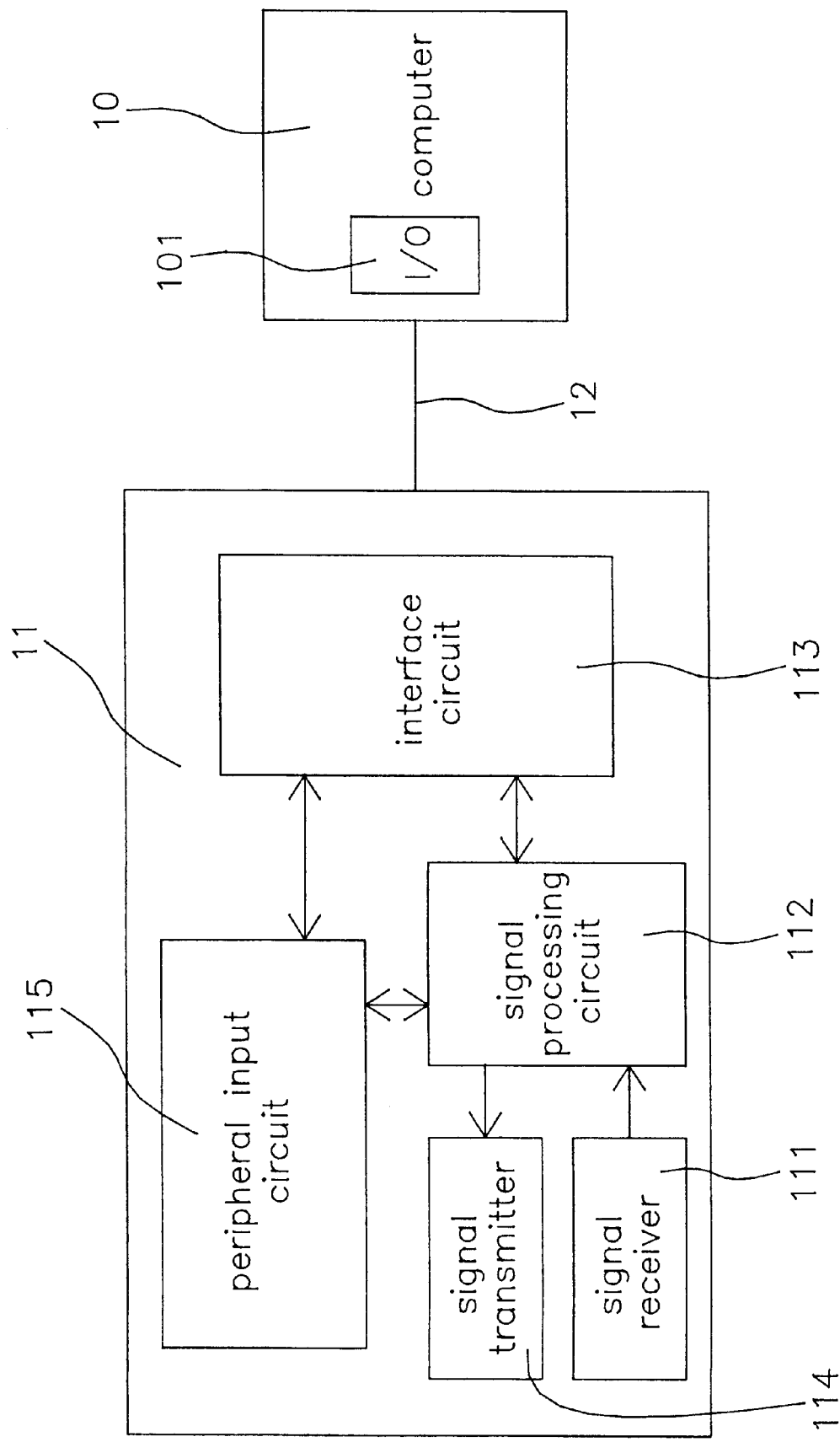
FIG. 1 is a block diagram illustrating the computer peripheral input device of a first preferred embodiment of the present invention.

As shown in FIG. 1, a computer peripheral input device 11 of the first preferred embodiment of the present invention includes a signal receiver 111, a signal processing circuit 112, an interface circuit 113, a signal transmitter 114, and a peripheral input circuit 115. The interface circuit 113 is connected with a computer 10 by a cable 12.

The signal receiver 111 is used to wirelessly receive an input remote signal, which is then sent to the signal processing circuit 112 by which the input remote signal is converted into a digital signal. The digital signal is transmitted to the output/input port 101 of the computer 10 through the interface circuit 113 via the cable 12. On the other hand, the digital signals of data sent out from the computer 10 can also be transmitted to the interface circuit 113 through the output/input port 101 of the computer 10 via the cable 12. Thereafter, the digital signals from the computer 10 are processed in the signal processing circuit 112 to become an output signal capable of being wirelessly transmitted by the signal transmitter 114. The peripheral input circuit 115 generates ordinary peripheral input signals, such as a mouse control signal, a trackball control signal, a keyboard control signal and a joystick control signal, etc.

Figure 2:
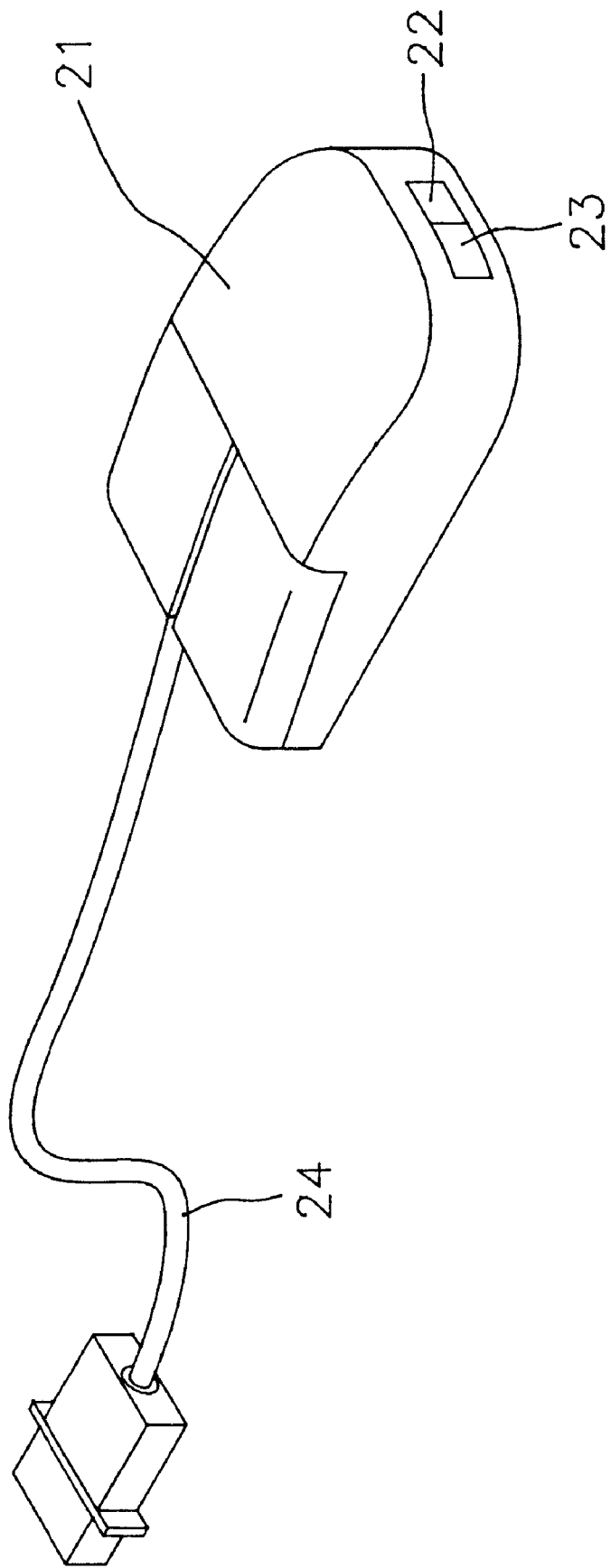
FIG. 2 is a schematic view illustrating the application of the present invention to a mouse.

The output/input port 101 of the computer 10 may be RS232, PS/2, game, keyboard or USB (universe serious bus). The circuit for wirelessly receiving and transmitting signals can be applied to a mouse to construct a first preferred embodiment of a computer peripheral input device 11 according to the present invention, as illustrated in FIG. 2. The mouse includes a housing 21, a receiver 22, a transmitter 23 and a cable 24 connecting the mouse with a computer. The computer peripheral input device 11 of the present invention is housed in the housing 21 of the mouse.

Figure 3:
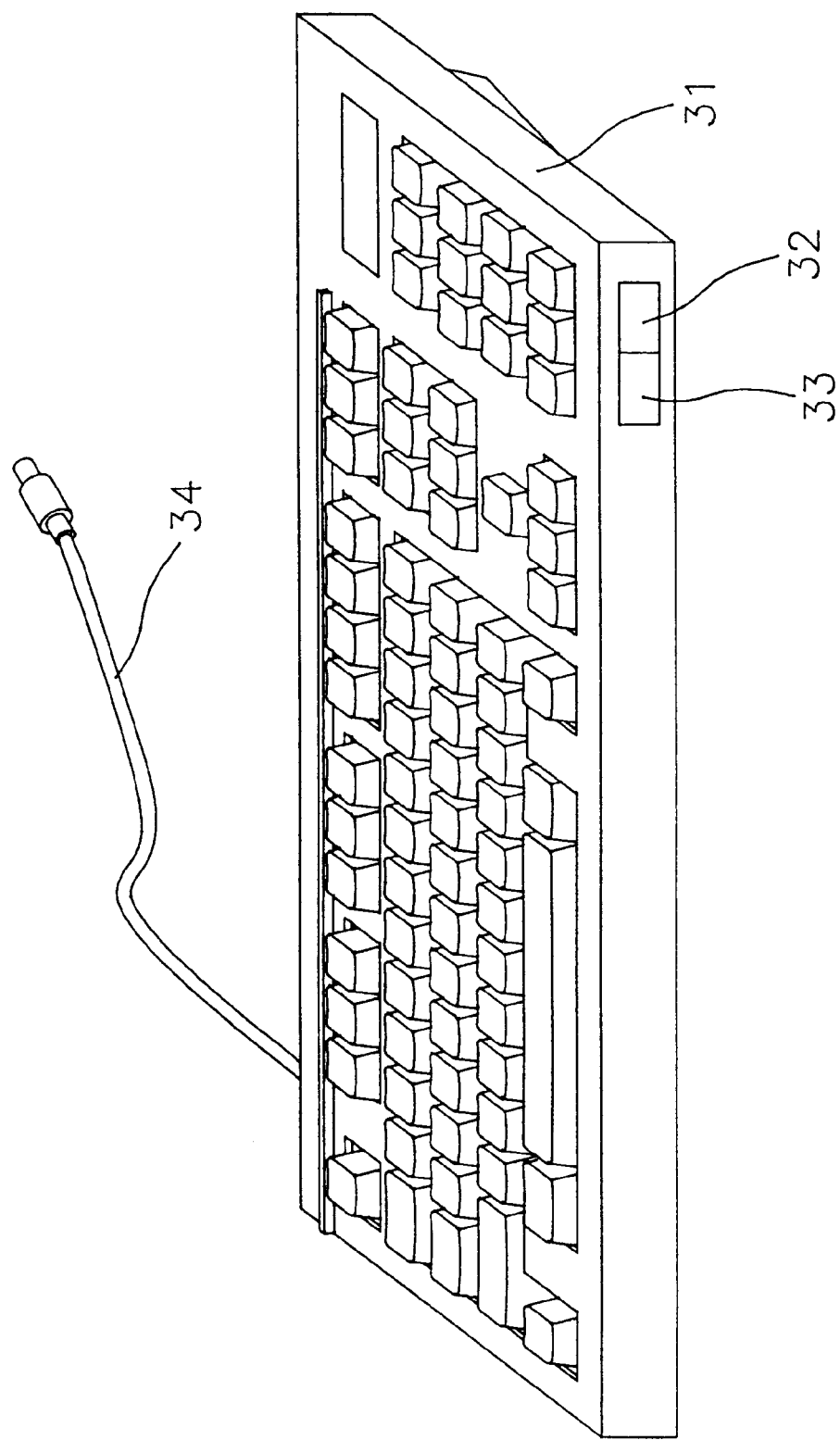
FIG. 3 is a schematic view illustrating the application of the present invention to a keyboard.

The circuit for wirelessly receiving and transmitting signals can be applied to a keyboard to construct a second preferred embodiment of a computer peripheral input device 11 according to the present invention, as illustrated in FIG. 3. The keyboard includes a main body 31, a receiver 32, a transmitter 33, and a cable 34 connecting the keyboard with a computer. The computer peripheral input device 11 of the present invention is incorporated into the main body 31 of the keyboard.

Figure 4:
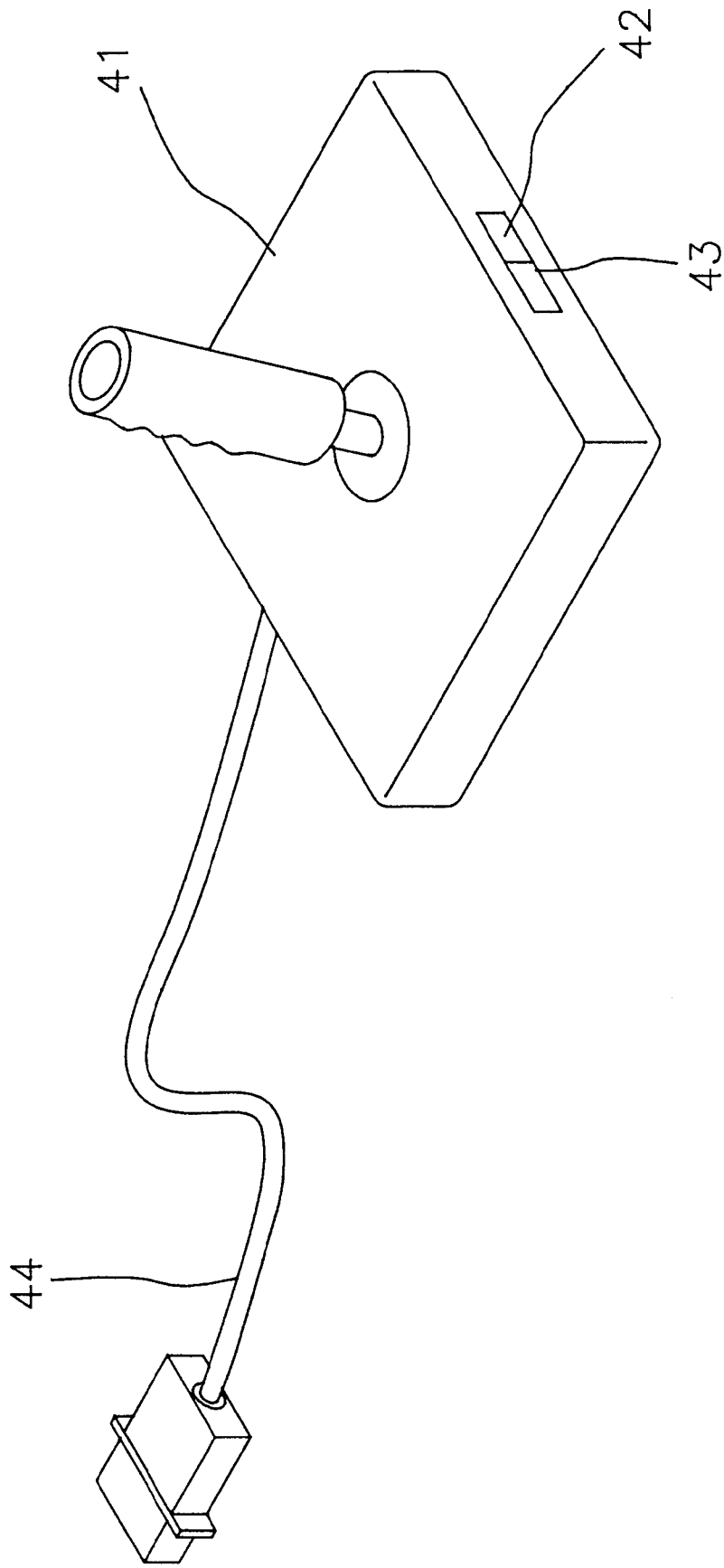
FIG. 4 is a schematic view illustrating the application of the present invention to a joystick.

The circuit for wirelessly receiving and transmitting signals can be applied to a joystick to construct a third preferred embodiment of a computer peripheral input device 11 according to the present invention, as illustrated in FIG. 4. The computer peripheral input circuit of the present invention is arranged in a main body 41 of a joystick which further includes a receiver 42, a transmitter 43, and a cable 44 connecting the joystick with a computer.

Figure 5:
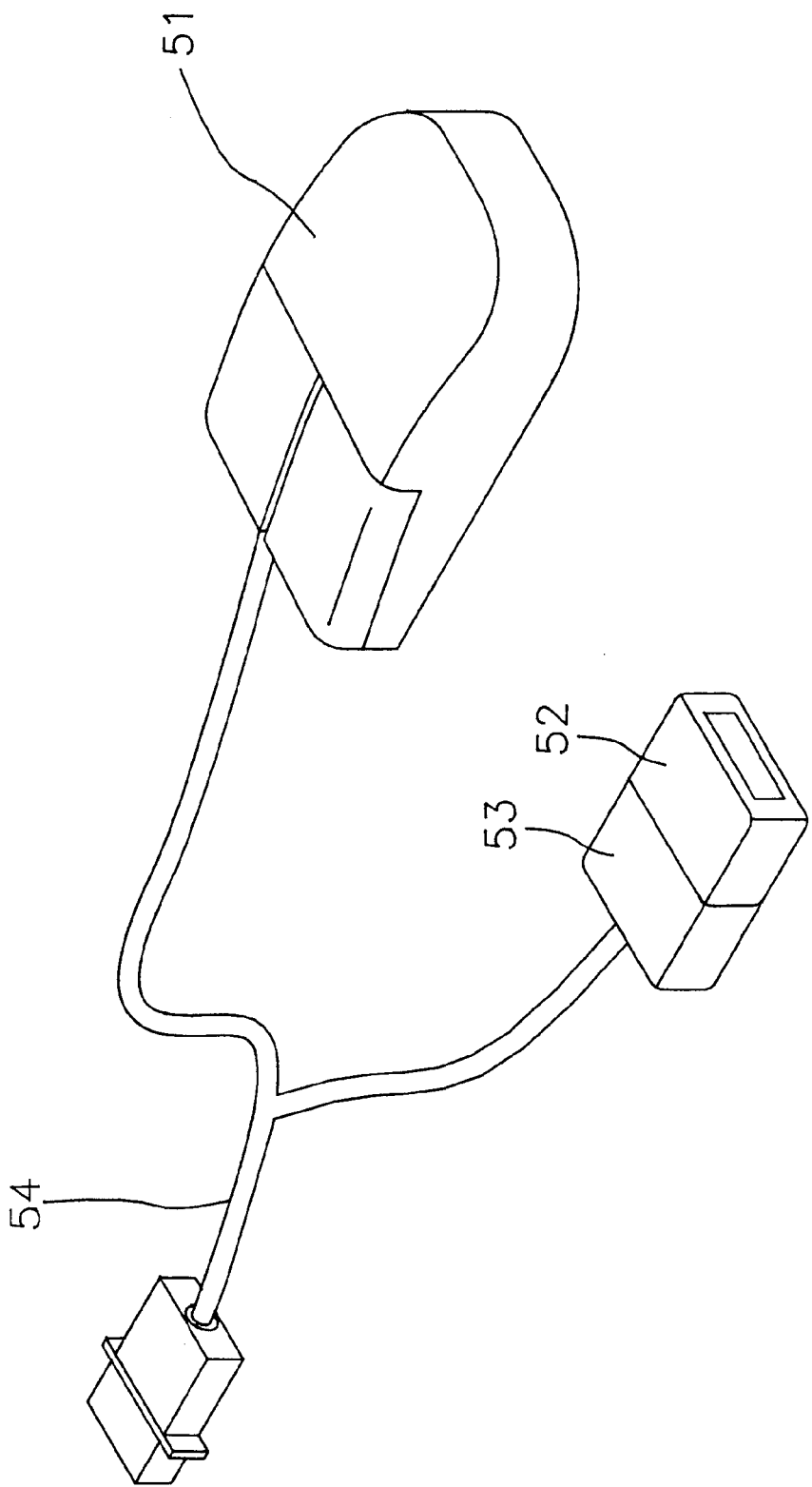
FIG. 5 is a schematic view illustrating the application of the computer peripheral input device of another preferred embodiment of the present invention to a mouse.

As shown in FIG. 5, a fourth preferred embodiment of a computer peripheral input device 11 according to the present invention is incorporated into a mouse including a main body 51, a receiver 52, a transmitter 53, and a cable 54 connecting the mouse with a computer. It is to be noted here that the receiver 52 and the transmitter 53 are set up separately from the main body 51, and that the cable 54 has a Y shape.

It is suggested that additional power supply should be made available to the receiver and the transmitter when the data communication is brought about by means of the high speed infrared signals. On the other hand, if the data communication is brought about by means of the low speed infrared signals, no additional power supply is called for in view of the fact that the power supply of the computer is sufficient to meet the power requirements of the receiver and the transmitter.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A computer peripheral input device with a circuit for wirelessly receiving and transmitting signals, comprising:
   a signal receiver for wirelessly receiving an input signal for a local computer connected to said peripheral unit having an output/input port;
   a signal transmitter for wirelessly transmitting an output signal from said computer;
   a signal processing circuit electrically connected to said signal receiver and said signal transmitter and electrically connected to said output/input port for providing said computer with a signal through said output/input port in response to said input signal received by said signal receiver and providing said output signal for said signal transmitter in response to a signal output from said output/input port of said computer;
   a peripheral input circuit electrically connected to said computer for providing a locally generated computer peripheral signal including commands and data to said computer through said output/input port; and
   a main body for mounting therein said peripheral input circuit, said signal receiver and said signal transmitter.

2. The computer peripheral input device according to claim 1, further comprising an interface circuit electrically connected to said computer, said signal processing circuit and said peripheral input circuit for respectively communicating between said output/input port of said computer and said signal processing circuit and between said output/input port of said computer and said peripheral input circuit.

3. The computer peripheral input device according to claim 1, further comprising a cable for transmitting said signals between said computer and said signal processing circuit and transmitting said computer peripheral signal from said peripheral input circuit to said computer.

4. The computer peripheral input device according to claim 1 wherein said peripheral input circuit is a mouse circuit.

5. The computer peripheral input device according to claim 1 wherein said peripheral input circuit is a keyboard circuit.

6. The computer peripheral input device according to claim 1 wherein said peripheral input circuit is a joystick circuit.

7. The computer peripheral input device according to claim 1 wherein said signal receiver is an infrared receiver.

8. The computer peripheral input device according to claim 1 wherein said signal transmitter is an infrared transmitter.

9. A computer peripheral input device with a circuit for wirelessly receiving and transmitting signals, comprising:
   a signal receiver for wirelessly receiving an input signal for a local computer connected to said peripheral input device having an output/input port;
   a signal transmitter for wirelessly transmitting an output signal from said computer;
   a signal processing circuit electrically connected to said signal receiver and said signal transmitter and electrically connected to said output/input port for providing said computer with a signal through said output/input port in response to said input signal received by said signal receiver and providing said output signal for said signal transmitter in response to a signal output from said output/input port of said computer;
   a peripheral input circuit electrically connected to said computer for providing a locally generated computer peripheral signal including commands and data to said computer through said output/input port;
   a main body for mounting therein said peripheral input circuit, said signal receiver and said signal transmitter; and
   wherein said peripheral input circuit is selected from the group consisting of a keyboard circuit, a joy stick circuit, and a mouse circuit.

10. The computer peripheral input device according to claim 9, further comprising an interface circuit electrically connected to said computer, said signal processing circuit and said peripheral input circuit for respectively communicating between said output/input port of said computer and said signal processing circuit and between said output/input port of said computer and said peripheral input circuit.

11. The computer peripheral input device according to claim 9, further comprising a cable for transmitting said signals between said computer and said signal processing circuit and transmitting said computer peripheral signal from said peripheral input circuit to said computer.

12. The computer peripheral input device according to claim 9, wherein said signal receiver is an infrared receiver.

13. The computer peripheral input device according to claim 9, wherein said signal transmitter is an infrared transmitter.

* * * * *